US008844893B2

(12) United States Patent
Spagnolo et al.

(10) Patent No.: US 8,844,893 B2
(45) Date of Patent: Sep. 30, 2014

(54) ANTENNA FIXING UNIT

(75) Inventors: Gioele Spagnolo, Malo (IT); Torsten Karcher, Leingarten (DE); Natalino Salin, Dueville (IT); Daniel Zamberlan, Creazzo (IT); Massimo Calearo Ciman, Costabissara (IT); Vito Rotondi, Ponte San Nicolo' (IT)

(73) Assignee: Calearo Antenne S.p.A., Milan (IT)

( * ) Notice: Subject to any disclaimer, the term of this patent is extended or adjusted under 35 U.S.C. 154(b) by 24 days.

(21) Appl. No.: 13/264,240

(22) PCT Filed: Jul. 27, 2011

(86) PCT No.: PCT/EP2011/062935
§ 371 (c)(1),
(2), (4) Date: Nov. 18, 2011

(87) PCT Pub. No.: WO2012/013718
PCT Pub. Date: Feb. 2, 2012

(65) Prior Publication Data

US 2013/0112837 A1 May 9, 2013

(30) Foreign Application Priority Data

Jul. 28, 2010 (IT) ............................... VI2010A0209

(51) Int. Cl.
*F16M 13/00* (2006.01)
*H01Q 1/12* (2006.01)
*H01Q 1/32* (2006.01)

(52) U.S. Cl.
CPC ............... *H01Q 1/12* (2013.01); *H01Q 1/1214* (2013.01); *H01Q 1/32* (2013.01); *H01Q 1/3275* (2013.01)
USPC .......... 248/546; 248/535; 248/534; 248/27.1; 248/216.1; 248/222.14; 343/872

(58) Field of Classification Search
USPC ........ 248/535, 546, 27.1, 216.1, 222.14, 534; 343/872
See application file for complete search history.

(56) References Cited

U.S. PATENT DOCUMENTS

| | | | | |
|---|---|---|---|---|
| 1,257,536 | A * | 2/1918 | Schroeder | 248/516 |
| 2,496,938 | A * | 2/1950 | Friedman | 174/88 C |
| 4,109,251 | A * | 8/1978 | MacDougall | 343/715 |
| 4,169,575 | A * | 10/1979 | Stefano | 248/539 |
| 6,236,377 | B1 | 5/2001 | Hussaini et al. | |
| 6,714,171 | B2 * | 3/2004 | Haussler et al. | 343/888 |
| 6,879,301 | B2 * | 4/2005 | Kozlovski | 343/878 |
| 2004/0183734 | A1 | 9/2004 | Noro | |
| 2005/0024280 | A1 * | 2/2005 | Takahashi | 343/713 |
| 2005/0237248 | A1 | 10/2005 | Nakano et al. | |
| 2009/0079640 | A1 | 3/2009 | Gray et al. | |
| 2011/0260030 | A1 * | 10/2011 | Calearo et al. | 248/534 |

* cited by examiner

*Primary Examiner* — Bradley Duckworth
*Assistant Examiner* — Asha Puttaiah
(74) *Attorney, Agent, or Firm* — IP Strategies

(57) ABSTRACT

The invention is a unit for fixing an antenna, comprising: a base element suited to support the antenna, provided with a contact surface suited to rest against a plate-like supporting body; a fixing element comprising a main body suited to be connected to the base element through joining means that define a connection direction, and a projecting body mainly developed according to the connection direction and associated with the main body through a deformable connection section. The projecting body has a reference surface facing a corresponding thrust surface of the main body and spaced from it, the connection section being configured so that its deformation makes it possible to move near each other and bring into contact the reference surface and the thrust surface when the fixing element is connected to the base element.

12 Claims, 6 Drawing Sheets

ANTENNA FIXING UNIT

FIELD OF THE INVENTION

The present invention concerns a unit for fixing an antenna to a plate-like supporting body like, for example, the roof of a vehicle.

BACKGROUND OF THE INVENTION

A fixing unit of known type comprises a base element that supports the antenna, provided with a contact surface that is arranged so that it rests on the outside of the vehicle's roof.

A fixing element is also provided, which is connected to the base element through a screw and comprises a plurality of projecting bodies mainly developed according to the connection direction defined by the screw, with the ends slightly parted.

In order to fix the antenna to the roof, the base element and the fixing element are first arranged on opposite sides of the roof at the level of an apposite through hole.

Successively, the screw is screwed so that the ends of the projecting bodies come into contact with the roof.

The above mentioned projecting bodies are elastically deformable so that their ends can be mutually moved near each other, and the fixing element can be snap-fitted into the hole made in the vehicle's roof.

This makes it possible to install the antenna on the roof with the fixing element already previously connected to the base element, so as to facilitate the operation.

However, the known fixing body described above poses the drawback that the fixing element alone does not allow the antenna to be effectively fixed to the roof.

In fact, the deformability of the projecting bodies, which allows them to be moved near each other and then parted, limits the tightening force that can be exerted on the roof by the projecting bodies.

A further drawback due to said deformability lies in that the projecting bodies tend to part excessively during tightening, thus further limiting the tightening force.

Consequently, in the fixing units of known type there is usually a cage suited to contain the fixing element and to limit the deformation of the projecting bodies.

However, the above mentioned containment cage poses the drawback that it increases the number of components of the fixing unit and therefore its cost.

Furthermore, the larger number of components of the fixing unit means an increase in the corresponding assembly time.

A further drawback of the fixing unit described above lies in that the elastic reaction following the deformation of the projecting bodies tends to cause the progressive loosening of the screw, especially in the presence of vibrations which are inevitable in a vehicle.

BRIEF SUMMARY OF THE INVENTION

The present invention intends to overcome all the drawbacks of the known art as outlined above.

In particular, it is a first object of the present invention to provide a unit for fixing an antenna to a plate-like supporting body having a lower number of components than the fixing units of known type, while offering the same fixing effectiveness.

It is also the object of the invention to prevent the spontaneous loosening of the fixing unit.

The above mentioned objects are achieved by a fixing unit carried out according to the main claim.

Further detail characteristics of the fixing unit of the invention are specified in the relevant dependent claims.

Advantageously, the lower number of components makes it possible to reduce the complexity of the fixing unit and therefore its cost compared to the fixing units of known type.

Still advantageously, the lower number of components makes it possible to reduce the fixing unit assembly time.

Furthermore, advantageously, the reduced risk of spontaneous loosening of the screw makes it possible to prevent any damage due to imperfect fixing of the antenna and the corresponding maintenance costs.

BRIEF DESCRIPTION OF THE DRAWINGS

The said objects and advantages, together with others which will be highlighted below, are illustrated in the description of a preferred embodiment of the invention which is provided by way of non-limiting example with reference to the attached drawings, wherein.

DETAILED DESCRIPTION OF THE INVENTION

Figure 1:
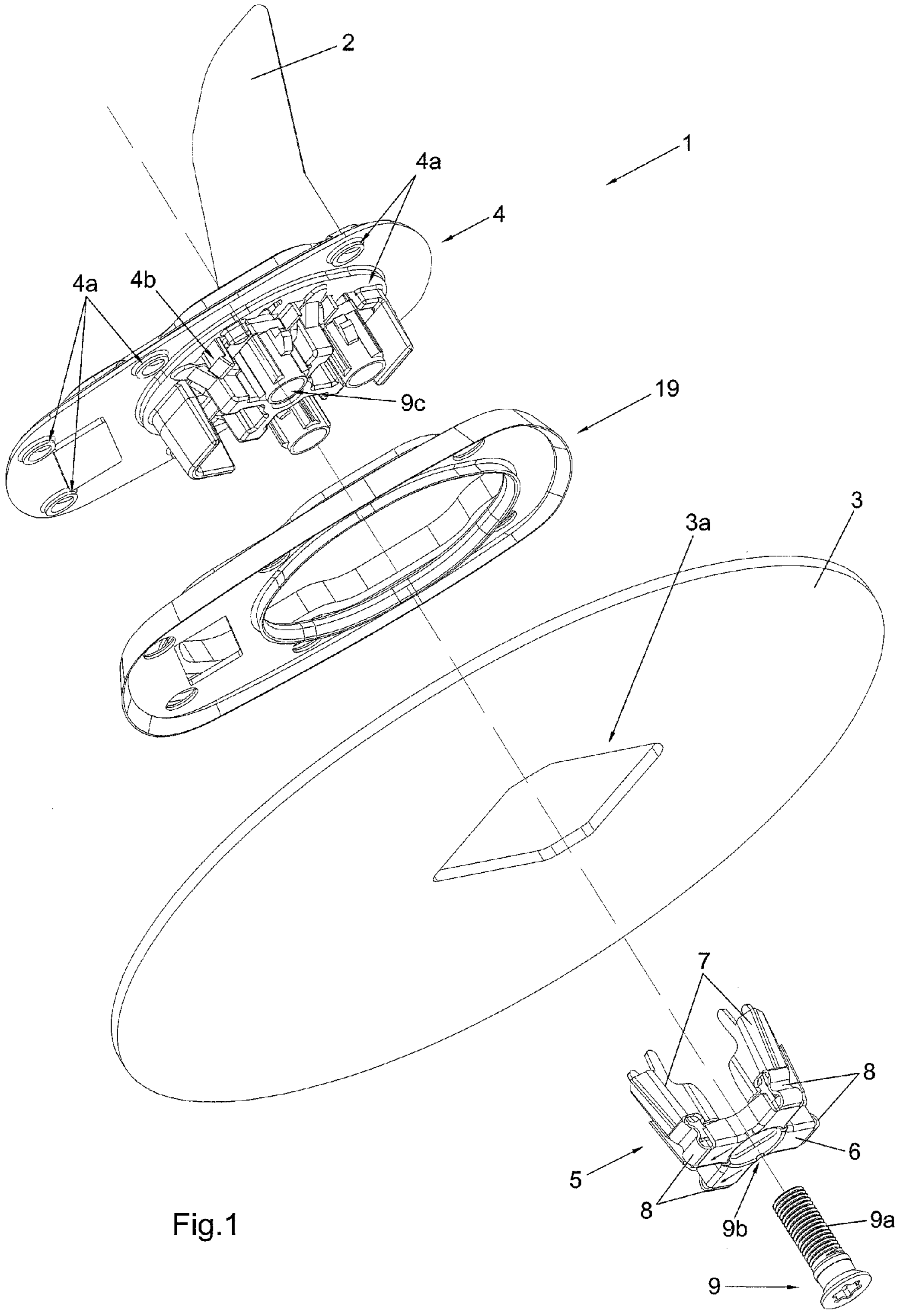
FIG. 1 shows an exploded axonometric view of the fixing unit that is the subject of the invention.

The fixing unit of the invention, shown in FIG. 1 and indicated as a whole by 1, is particularly suited to be used to fix an antenna 2 to a plate-like supporting body 3 like, for example, the roof of a vehicle, on which a through hole 3*a* has been previously made.

As shown in the figure, the fixing unit 1 comprises a base element 4 that supports an antenna 2 of the type known per se and is provided with a contact surface 4*a* suited to be arranged so that it rests on the plate-like supporting body 3.

The contact surface 4*a* is preferably but not necessarily defined by a plurality of projecting areas spaced from one another that advantageously allow the contact surface 4*a* to effectively rest on plate-like supporting bodies featuring different curvatures.

The fixing unit 1 also comprises a fixing element 5 that can be connected to the base element 4 through the hole 3*a* so that it can be arranged on the opposite side of the plate-like supporting body 3.

In particular, the fixing element 5 comprises a main body 6 that can be connected to the base element 4 through joining means 9 that are known per se and define a connection direction X incident on the contact surface 4*a* of the base element 4.

Said joining means 9 preferably comprise a screw 9*a* that can be inserted in a through hole 9*b* belonging to the fixing element 5 and suited to be screwed into a nut screw 9*c* belonging to the base element 4.

Obviously, in variant embodiments of the invention, the screw 9*a* can be replaced by any joining means 9 of known type equivalent to the screw 9*a*.

Four projecting bodies 7 extend from said main body 6 and develop mainly according to the connection direction X.

Obviously, in variant embodiments of known type, the projecting bodies 7 can be present in any number, even different from four, and in the limit case even one only.

Figure 2:
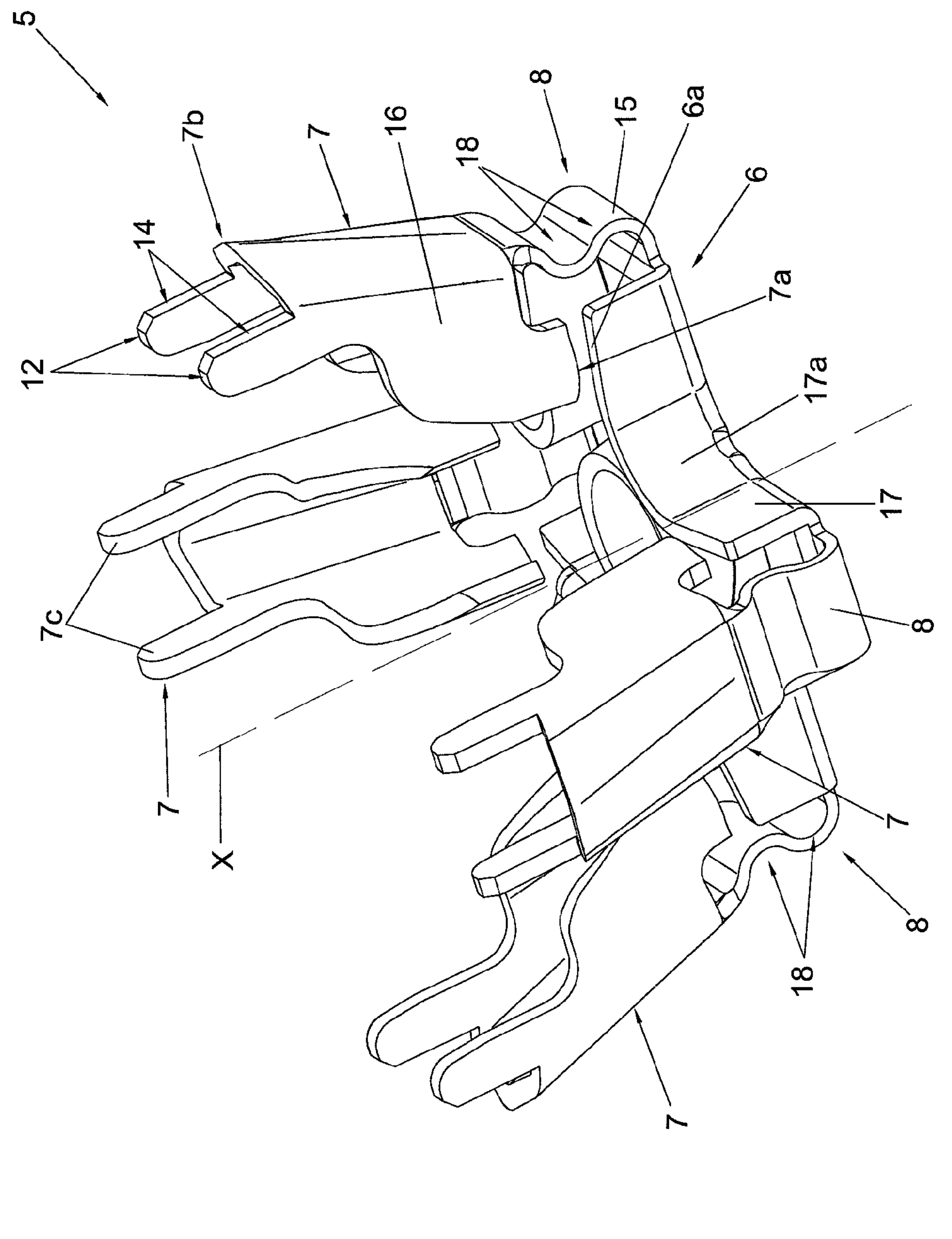
FIG. 2 shows an axonometric view from a different angle of an enlarged component of the fixing unit of FIG. 1.

As shown in greater detail in FIG. 2, each projecting body 7 is associated with the main body 6 through a deformable connection section 8 suited to allow the projecting body 7 to vary its inclination with respect to the connection direction X.

Figure 5:
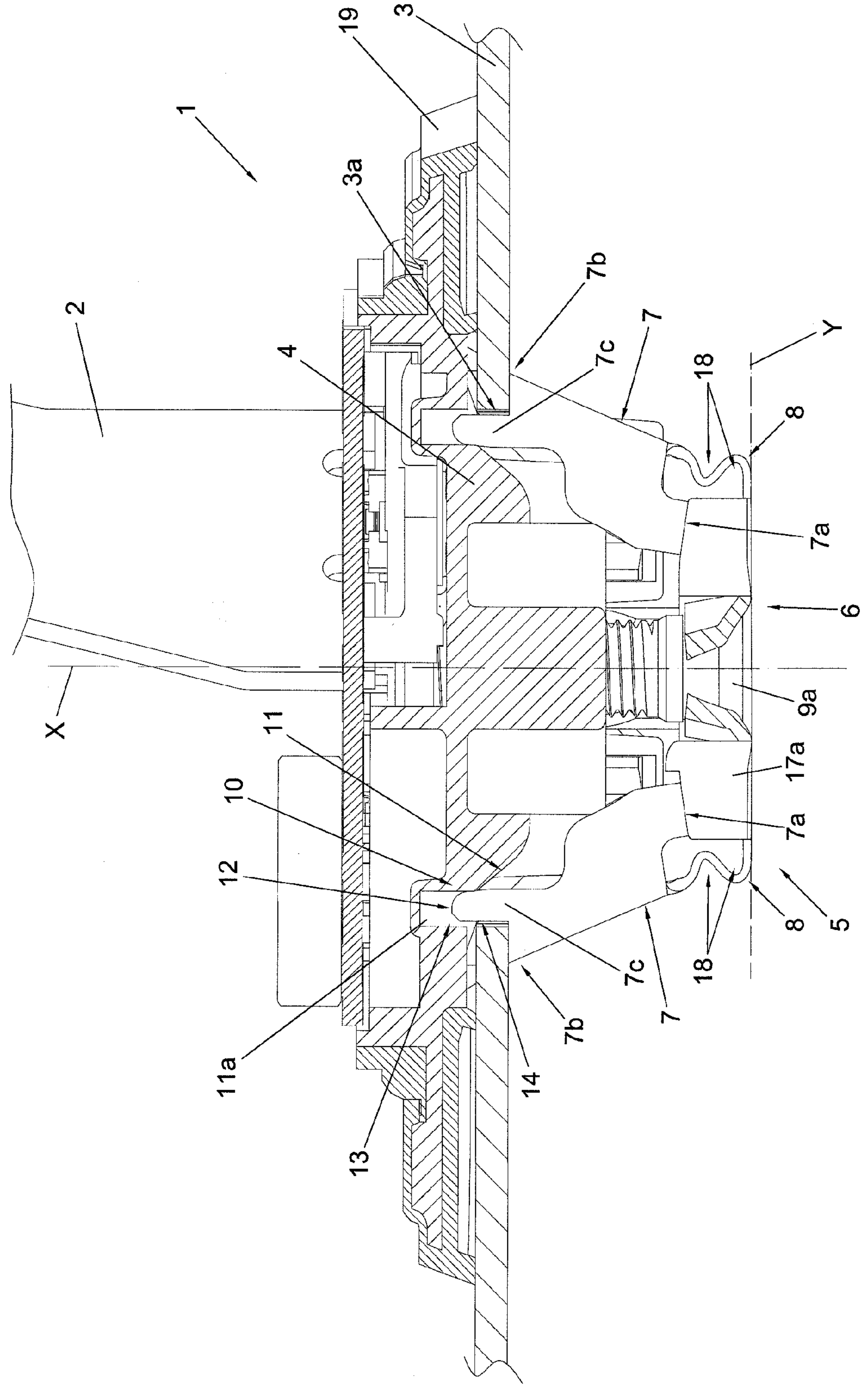

Advantageously, the deformability of the connection section 8 makes it possible to part the projecting bodies 7 so that the corresponding ends 7*b* are arranged against the edges of the hole 3*a* on the opposite side of the base element 4, so as to fix the antenna 2 to the plate-like supporting body 3 in the manner shown in FIG. 5.

According to a variant embodiment not illustrated herein, the projecting bodies 7, in a non-deformed configuration, diverge so that their overall width exceeds the width of the hole 3*a*.

In this case, the deformability of the connection section 8 advantageously makes it possible to move the projecting bodies 7 near each other during insertion of the fixing element 5 through the hole 3*a*.

Preferably but not necessarily, there is also a sealing element 19, visible in FIG. 1, made of rubber or another equivalent material, which is associated with the base element 4 to prevent the passage of humidity and/or dust through the hole 3*a*.

According to the invention and as shown in particular in FIG. 2, each projecting body 7 of the fixing element 5 has a reference surface 7*a* facing a corresponding thrust surface 6*a* of the main body 6 and spaced from it.

Furthermore, the connection sections 8 are configured so that they deform in order to allow the corresponding projecting bodies 7 to move near the main body 6 when the fixing element 5 is pushed towards the base element 4 while the antenna 2 is being fixed to the plate-like supporting body 3.

The deformation of the connection sections 8 allows the reference surfaces 7*a* to rest on the corresponding thrust surfaces 6*a*, as shown in FIG. 5.

Consequently, the tightening force of the screw 9*a* can be transmitted from the main body 6 to the projecting bodies 7 according to a direction that is substantially parallel to the connection direction X and, therefore, substantially parallel to the direction of development of the projecting bodies 7.

Therefore, if the main body 6 and the projecting bodies 7 are configured so as to be sufficiently rigid, the fixing element 5 makes it possible to transmit a tightening force that is much higher than allowed by the fixing units of known type, with no need to use a containment cage for the fixing element 5.

The invention thus achieves the object to provide a fixing unit 1 that, while granting the same effectiveness as the fixing units of known type, has a lower number of components.

The fixing element 5 is preferably but not necessarily obtained by cutting and bending a sheet made of a metallic material, for example steel.

In particular, as shown in FIG. 2, each connection section 8, each projecting body 7 and the main body 6 are respectively a first, a second and a third plate-like body 15, 16 and 17 belonging to said sheet.

Preferably, the third plate-like body 15 corresponding to the main body 6 is developed mainly according to a plane Y perpendicular to the connection direction X.

Said third plate-like body 17 is provided with perimeter edges 17*a* facing towards the connection direction X, which define the above mentioned thrust surface 6*a*.

Advantageously, the presence of said perimeter edges 17*a* makes it possible to stiffen the main body 6 enough to transmit the tightening force produced by the screw 9*a*.

In their turn, the projecting bodies 7 comprise a corresponding number of second plate-like bodies 16 connected to the periphery of the main body 6.

Preferably, the cross section of each second plate-like body 16 with respect to a plane perpendicular to the connection direction X has a concave profile.

Advantageously, the above mentioned concave shape makes it possible to stiffen the projecting bodies 7 according to the corresponding longitudinal directions, so as to make them suited to transmit the tightening force.

The ends 7*b* of each projecting body 7 are preferably but not necessarily configured so as to cut the plate-like supporting body 3 in order to advantageously facilitate the electric contact between the projecting bodies 7 and the plate-like supporting body 3 and, therefore, to allow the antenna 2 to be earthed.

This is achieved, in particular, by giving said ends 7*b* a pointed shape.

Regarding the first plate-like bodies 15 corresponding to the connection sections 8, each one of them is preferably provided with a series of concavities 18 arranged in succession, each one of which can be squashed according to the connection direction X.

It can be understood that said squashing action allows the deformation of the connection sections 8 so as to allow the projecting bodies 7 to move near the main body 6.

It is evident that the concavities 18 of the connection sections 8 can be present in any number.

The connection section 8 is preferably but not necessarily configured so as to be plastically deformed as a consequence of said approaching movement of the projecting body 7 to the main body 6.

Said plastic deformability can be obtained, for example, by properly selecting the material of the connection section 8 and its thickness.

Alternatively, it is possible to give one or more concavities 18 of the connection section 8 such a shape as to induce the stress to be concentrated in a predetermined point, for example the apex of the concavity 18.

Advantageously, said plastic deformation of the connection section 8 makes it possible to reduce the elastic reaction force following the fixing operation, which would tend to cause the screw 9*a* to become loose, especially in the presence of vibrations.

Therefore, said plastic deformation makes it possible to achieve the object to prevent the screw 9*a* from loosening after the antenna 2 has been fixed.

It is evident that, in variant embodiments of the invention, the fixing element 5 can have any shape different from the one described above, provided that the connection section 8 can be deformed as described above.

The fixing unit 1 preferably but not necessarily comprises guide means 10, visible in particular in FIGS. 3 to 6, suited to cause the projecting body 7 to part with respect to the connection direction X during connection of the fixing element 5 to the base element 4.

Advantageously, the presence of the guide means 10 makes it possible to cause a predetermined parting of the projecting bodies 7, independently of the thickness of the plate-like supporting body 3, so as to obtain optimal fixing results.

Furthermore, as the parting is caused by the guide means 10, it is not necessary to arrange the already parted projecting bodies 7 beyond the dimensions of the hole 3*a* of the plate-like supporting body 3.

On the contrary, it is possible to make the projecting bodies 7 so that their overall width in the non deformed configuration is smaller than the size of the hole 3*a* of the plate-like supporting body 3, so that they can be freely introduced in the hole 3*a* with no need to overcome their elastic resistance.

This, advantageously, facilitates the introduction of the projecting bodies 7 through the hole 3*a*.

Figure 6:
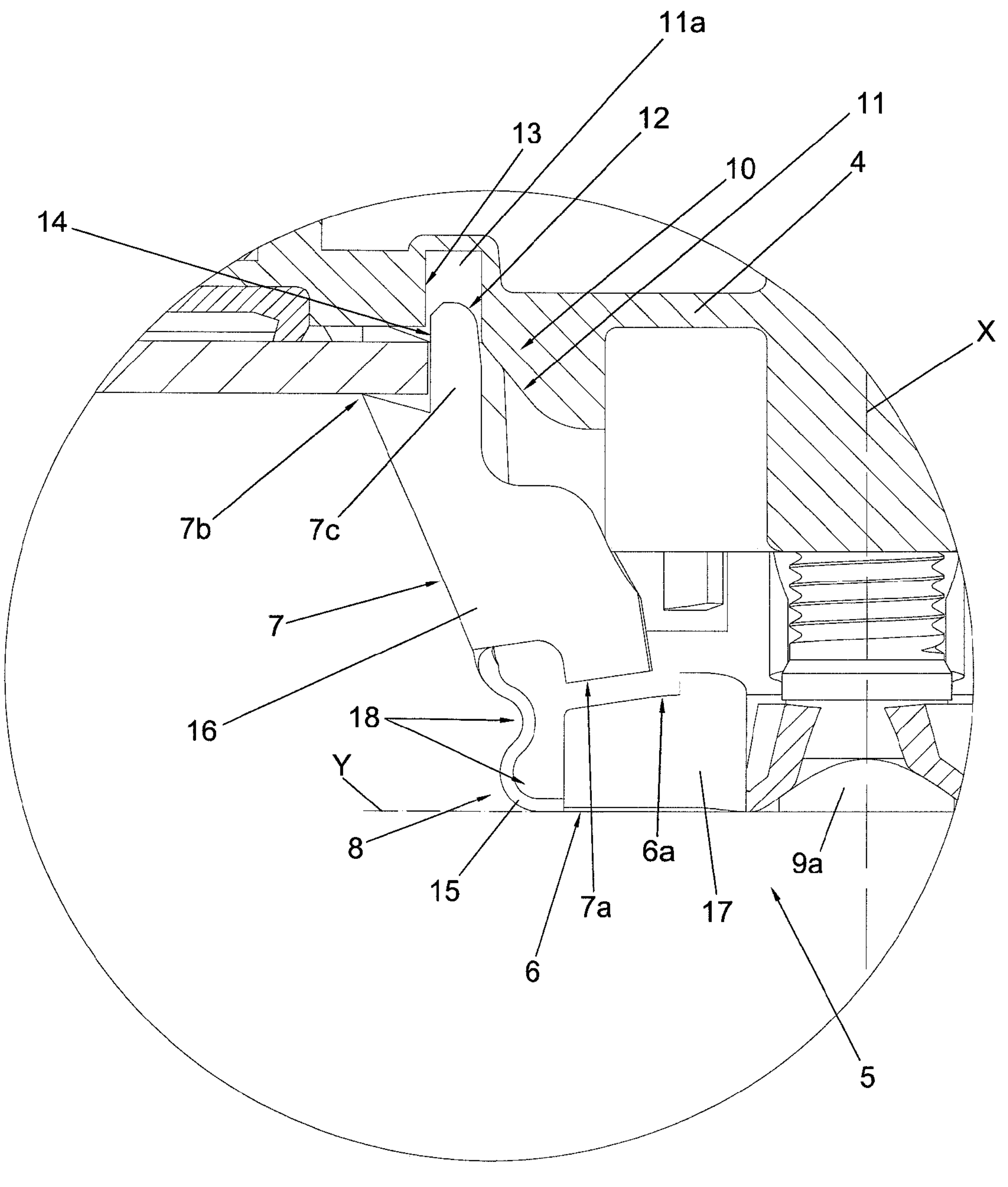
FIG. 6 shows an enlarged detail of FIG. 4.

Preferably, and as shown in greater detail in FIG. 6, said guide means 10 comprise a guide surface 11 belonging to the base element 4, inclined with respect to the connection direction X.

The projecting body 7 is also provided with a countersurface 12 suited to slide on said guide surface 11 while the base element 4 approaches the fixing element 5.

The guide means 10 preferably but not necessarily comprise also containment walls 13 belonging to the base element 4, cooperating through contact with corresponding shaped surfaces 14 belonging to each projecting body 7 to limit the parting of the projecting body 7.

Advantageously, the limited parting of the projecting bodies 7 favours the effectiveness of the tightening operation, since it allows the tightening force to be transmitted according to a direction substantially parallel to the connection direction X.

The above mentioned containment walls 13 preferably belong to corresponding cavities 11*a* obtained in the base element 4 and housing corresponding protrusions 7*c* belonging to the ends of each projecting body 7.

Advantageously, said cavities 11*a* make it possible to guide the parting of the projecting bodies 7 with precision.

Therefore, to advantage, said cavities 11*a* cause the projecting bodies 7 to be parted in the same measure, favouring the uniform distribution of the tightening force among the projecting bodies 7.

Furthermore, advantageously, the controlled parting of the projecting bodies 7 makes it possible to deform the connection sections 8 in the manner that is most suited to allow optimal contact between the reference surfaces 7*a* and the thrust surfaces 6*a*.

Said protrusions 7*c* are preferably but not necessarily configured so that, following the parting of the projecting bodies 7 caused by the guide means 10, they rest against the inner edges of the hole 3*a* in order to advantageously center the antenna 2.

From an operational point of view, to fix the antenna 2 to the roof of a vehicle, or to an analogous plate-like supporting body 3, first of all the fixing unit 1 is assembled by connecting the fixing element 5 to the base element 4 through the screw 9*a*, so that the guide means 10 are mutually aligned.

Figure 3:
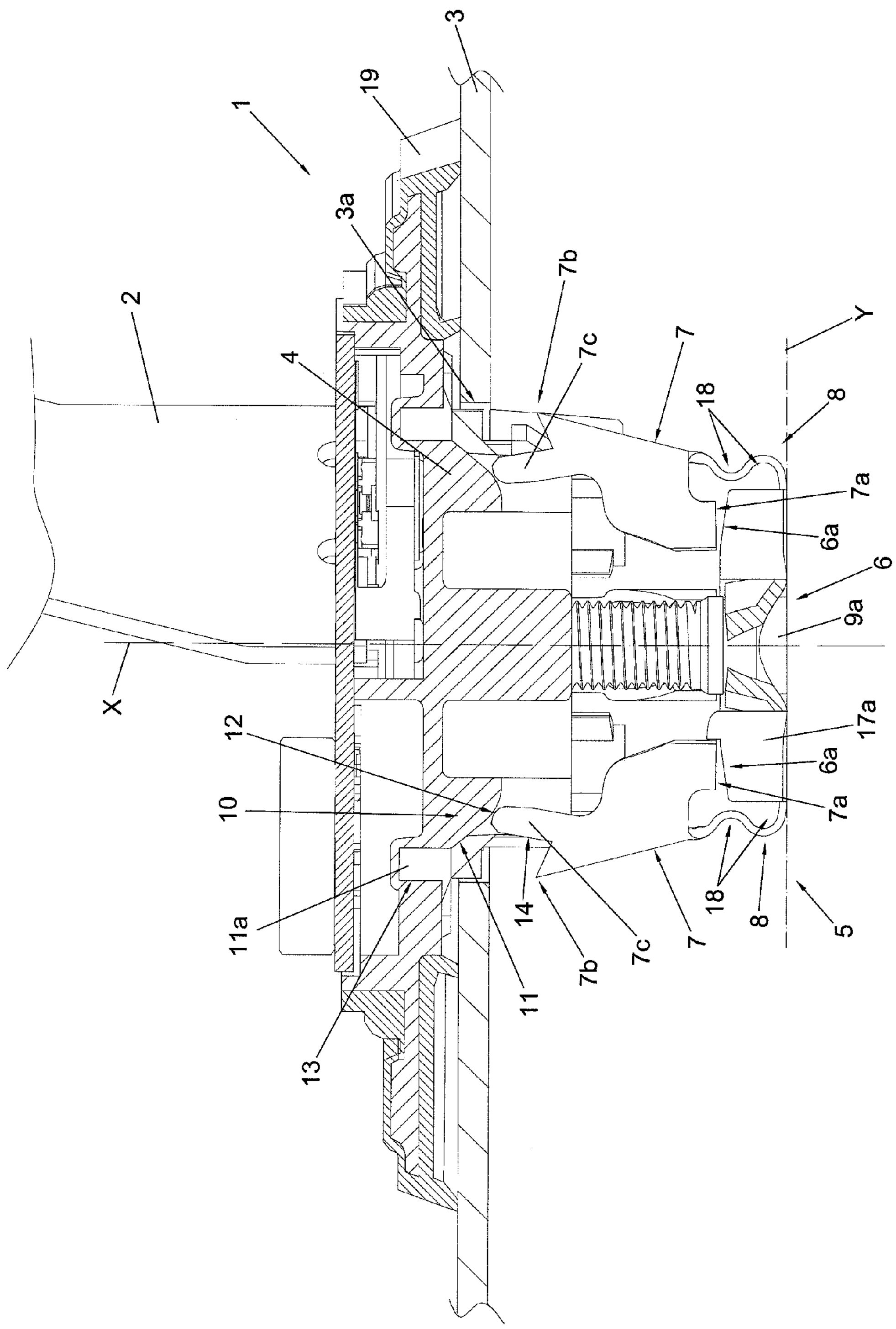
FIGS. 3 to 5 show a front partially sectioned view of the fixing unit of FIG. 1, in different operating configurations.

Successively, operating from the outside of the roof 3, the fixing element 5 is pushed through the hole 3*a*, in the position shown in FIG. 3.

The base element 4 preferably comprises snap-coupling teeth that advantageously engage in the roof 3 in order to maintain the fixing unit 1 in the correct position and thus facilitate the successive tightening of the screw 9*a*.

The operator then screws the fixing screw 9*a* so that the fixing element 5 approaches the base element 4.

During said approaching movement, the guide means 10 cause the parting of the projecting bodies 7 so that their pointed ends 7*b* are arranged facing the edges of the hole 3*a* of the plate-like supporting body 3.

After the parting operation, the protrusions 7*c* arranged at the ends of each projecting body 7 are inserted in the corresponding cavities 11*a* of the base element 4, so as to prevent the further parting of the projecting bodies 7.

Figure 4:
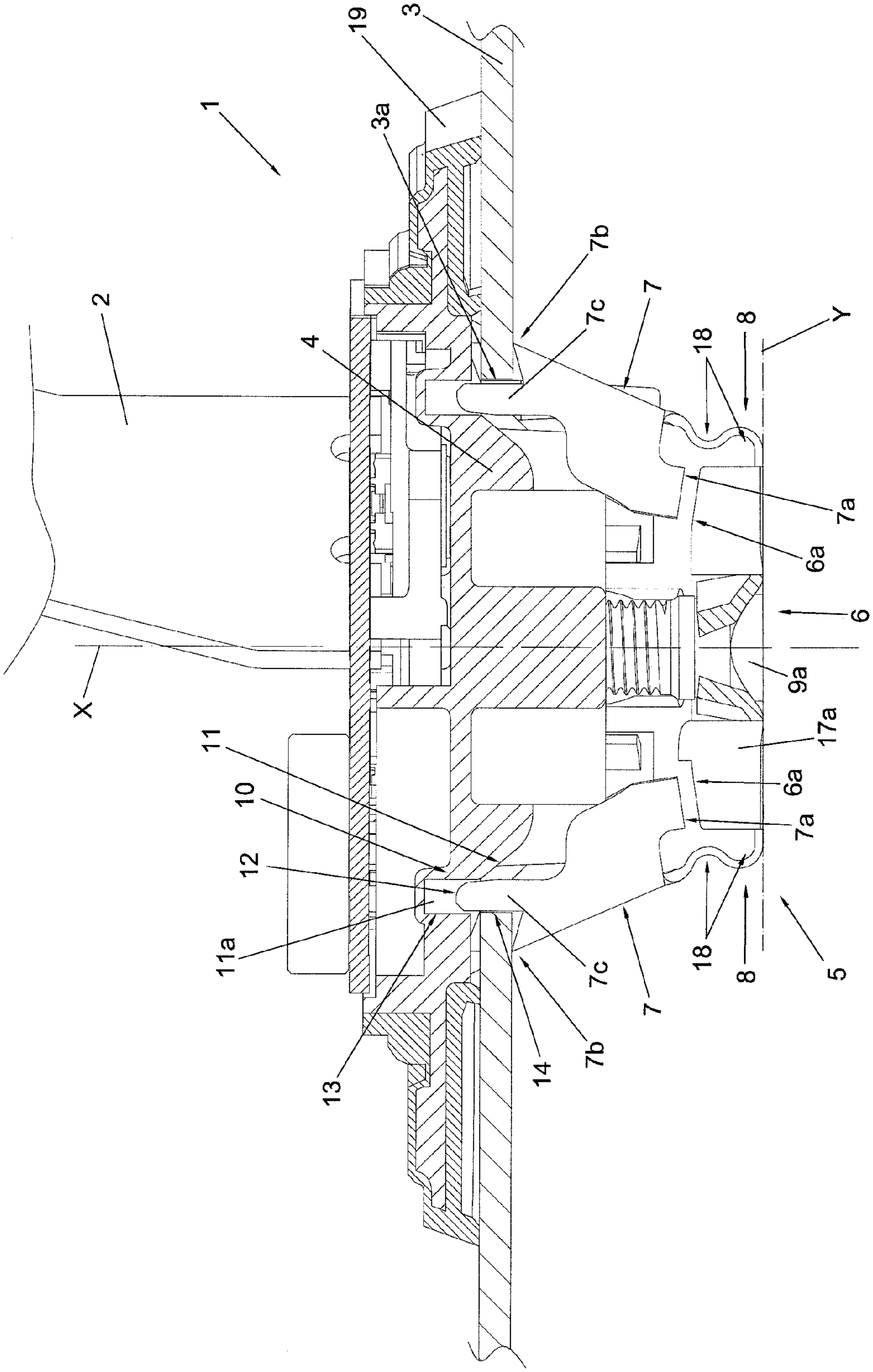

Continued screwing causes the pointed ends 7*b* to come into contact with the inner surface of the roof 3, in the position shown in FIG. 4.

At this point, the further screwing of the screw 9*a* causes the connection section 8 to yield and consequently the reference surface 7*a* of each projecting body 7 to move nearer to the corresponding thrust surface 6*a* of the main body 6.

Once said contact has taken place, as shown in FIG. 5, the tightening force of the screw 9*a* is completely transmitted to the projecting bodies 7, which are thrust against the roof 3 thus fixing the antenna 2.

During this operation, the pointed ends 7*b* of the projecting bodies 7 cut the roof 3 so as to obtain the electric contact.

Preferably, the overall stroke of the screw 9*a* is such as to allow the fixing unit 1 to be used on plate-like supporting bodies 3 having different thicknesses.

This can be achieved, for example, by configuring the guide means 10 so that they produce the complete parting of the projecting bodies 7 before they come into contact with a plate-like supporting body 3 having the maximum allowable thickness.

Furthermore, the screwing operation is preferably carried out using a properly set torque wrench, which allows the fixing unit 1 to be installed applying a uniform tightening force, independently of the thickness of the plate-like supporting body 3.

The above clearly shows that the fixing unit of the invention achieves all the set objects.

In particular, the reference surfaces on the projecting bodies and the corresponding thrust surfaces on the main body of the fixing element facing each other allow the tightening force of the screw to be effectively transmitted to the ends of the projecting bodies.

Consequently, it is possible to limit the number of components compared to the fixing units of know type and equivalent effectiveness, in which it is necessary to use a cage for containing the fixing element.

Furthermore, the plastic deformation of the connection section makes it possible to limit the elastic reaction following the fixing operation, thus preventing the screw from accidentally becoming loose due, for example, to vibrations.

During construction, the fixing unit that is the subject of the invention may be subjected to further changes that, even if not described herein and not illustrated in the drawings, must all be considered protected by the present patent, provided that they fall within the scope of the following claims.

Where technical features mentioned in any claim are followed by reference signs, those reference sings have been included for the sole purpose of increasing the intelligibility of the claims and accordingly such reference signs do not have any limiting effect on the protection of each element identified by way of example by such reference signs.

The invention claimed is:

1. Unit for fixing an antenna to a plate-like supporting body, comprising:

a base element configured to support said antenna, provided with a contact surface configured to rest against said plate-like supporting element;

a fixing element comprising:

a main body configured to be connected to said base element according to a connection direction, said connection direction being incident on said contact surface, said main body comprising a thrust surface;

at least one projecting body developed according to said connection direction, comprising a reference surface facing said thrust surface and a free end opposite to said main body with respect to said reference surface; and a connection body integrally connecting said main body to said at least one protecting body, being deformable in such a way as to allow the variation of the inclination angle of said projecting body with respect to said connection direction, and a joining element configured to connect said main body to said base element according to said connection direction;

wherein said reference surface and said thrust surface are mutually spaced, and wherein said connection body is deformable so as to allow moving said projecting body near said main body in an approaching movement until achieving contact between said reference surface and said thrust surface when said fixing element is connected to said base element to fix said antenna to said plate-like supporting body.

2. Fixing unit according to claim 1, wherein said connection body is configured to be plastically deformed during said approaching movement.

3. Fixing unit according to claim 1, wherein said connection body is a first plate-like body provided with at least one concavity configured to be squashed according to said connection direction.

4. Fixing unit according to claim 1, wherein said fixing unit comprises a guide element arranged to part said projecting body with respect to said connection direction during the connection of said fixing element to said base element.

5. Fixing unit according to claim 4, wherein said guide element comprises a guide surface belonging to said base element, inclined with respect to said connection direction, and a countersurface belonging to said projecting body, suited to slide on said guide surface while said base element is moved near said fixing element.

6. Fixing unit according to claim 4, wherein said guide element comprises a containment wall belonging to said base element and a shaped surface belonging to said projecting body, configured to be arranged in mutual contact in order to limit the parting of said projecting body.

7. Fixing unit according to claim 1, wherein said projecting body has one end configured so as to cut said plate-like supporting body.

8. Fixing unit according to claim 1, wherein said projecting body is a second plate-like body whose cross section has a concave profile with respect to a plane perpendicular to said connection direction.

9. Fixing unit according to claim 1, wherein said fixing element comprises at least two of said projecting bodies connected to the periphery of said main body.

10. Fixing unit according to claim 1, wherein said main body is a third plate-like body mainly developed according to a plane perpendicular to said connection direction and provided with perimeter edges facing said connection direction that define said thrust surface.

11. Fixing unit according to claim 1, wherein said joining element comprises a screw that can be inserted in a through hole belonging to said main body and suited to be screwed into a nut screw belonging to said base element.

12. Fixing unit according to claim 1, wherein said fixing element is a cut and bent sheet of metallic material.

* * * * *